(12) United States Patent
Beadle et al.

(10) Patent No.: US 6,530,075 B1
(45) Date of Patent: Mar. 4, 2003

(54) JIT/COMPILER JAVA LANGUAGE EXTENSIONS TO ENABLE FIELD PERFORMANCE AND SERVICEABILITY

(75) Inventors: Bruce Anthony Beadle, Round Rock, TX (US); Michael Wayne Brown, Georgetown, TX (US); Michael Anthony Paolini, Austin, TX (US); Douglas Scott Rothert, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,968

(22) Filed: Dec. 3, 1998

(51) Int. Cl.[7] ................................................ G06F 9/44
(52) U.S. Cl. ....................................... 717/114; 717/148
(58) Field of Search ................................ 717/9, 7, 4, 5, 717/6, 1, 151–167, 136, 140, 146–150, 114, 116, 118, 124, 100; 709/100

(56) References Cited

U.S. PATENT DOCUMENTS

| | | | | |
|---|---|---|---|---|
| 5,093,916 A | * | 3/1992 | Karl et al. ................. | 709/331 |
| 5,500,881 A | * | 3/1996 | Levin et al. ................ | 717/141 |
| 5,740,441 A | * | 4/1998 | Yellin et al. ................ | 717/134 |
| 5,748,961 A | * | 5/1998 | Hanna et al. ............... | 717/145 |
| 5,815,718 A | * | 9/1998 | Tock .......................... | 717/166 |
| 6,016,395 A | * | 1/2000 | Mohamed .................. | 717/149 |
| 6,078,744 A | * | 6/2000 | Wolczko et al. ........... | 717/153 |
| 6,110,226 A | * | 8/2000 | Bothner ..................... | 717/153 |
| 6,139,199 A | * | 10/2000 | Rodriguez ................. | 717/159 |
| 6,151,703 A | * | 11/2000 | Crelier ....................... | 717/136 |
| 6,233,725 B1 | * | 5/2001 | Beatle et al. ............... | 717/118 |
| 6,289,506 B1 | * | 9/2001 | Kwong et al. ............. | 717/148 |
| 6,317,872 B1 | * | 11/2001 | Gee et al. ................... | 717/152 |

OTHER PUBLICATIONS

Krall, Efficient JavaVM Just–in–time Compilation, Mar. 1998, IEEE.*

* cited by examiner

Primary Examiner—Gregory Morse
Assistant Examiner—Hoang-Vu Antony Nguyen-Ba
(74) Attorney, Agent, or Firm—Duke W. Yee; Jeffrey S. Labaw

(57) ABSTRACT

The present invention provides a method and apparatus in a data processing system for optimizing running of bytecode. An application programming interface is called for compilation of bytecode. The bytecode just in time compiling is enabled or disabled using the application programming interface. Compiling the bytecode is optimized by the programmer before compiling using pre-compile keywords. Compiling the bytecode is optimized during compiling using dynamic application programming interface calls. Dynamic runtime APIs enable or disable the just in time compiling of objects based on compiling errors, execution performance and frequency of execution.

65 Claims, 4 Drawing Sheets

OPTIMIZE_JITclass/methods/scope section

OPTIMIZE_NOJIT_class/methods/scope section

OPTIMIZE_INLINEclass or method_optimizing parameter

FIG. 2A    OPTIMIZE_JITclass/methods/scope section

FIG. 2B    OPTIMIZE_NOJIT_class/methods/scope section

FIG. 2C    OPTIMIZE_INLINEclass or method_optimizing parameter

FIG. 5A    public static void setJITEnabled(boolean Allowed)

FIG. 5B    public static boolean isJITDisabled()

JIT/COMPILER JAVA LANGUAGE EXTENSIONS TO ENABLE FIELD PERFORMANCE AND SERVICEABILITY

CROSS REFERENCE TO RELATED APPLICATIONS

The present invention is related to applications entitled A Method And Apparatus To Coordinate And Control The Simultaneous Use Of Multiple Just In Time Compilers With A Java Virtual Machine, U.S. patent application Ser. No. 09/204,513; A Method And Apparatus To Selectively Control Processing Of A Method In A Java Virtual Machine, U.S. patent application Ser. No. 09/204,512; Method And Apparatus For Automatic Service Of JIT Compiler Generated Errors, U.S. patent application Ser. No. 09/204,511; Method And Apparatus For Dynamically Selecting Bytecodes For Just In Time Compiling In A User's Environment, U.S. patent application Ser. No. 09/204,976; A Method And Apparatus For Dynamic Selection Of Which Bytecodes Should Be Just In Time Compiled, U.S. patent application Ser. No. 09/204,519; Dynamic Selection/Definition Of Which Class/Methods Should Or Should Not Be JIT'ed Using Information Stored In A Jar File, U.S. patent application Ser. No. 09/204,975; and Method And Apparatus For Dynamic Selection Of Instructions For Compiling Using Tags, U.S. patent application Ser. No. 09/204,516, all of which are filed even date hereof, assigned to the same assignee, and incorporated herein by reference.

BACKGROUND OF THE INVENTION

1. Technical Field

The present invention relates generally to an improved data processing system and in particular to an improved method and apparatus for processing a method in a Java Virtual Machine. Still more particularly, the present invention relates to a method and apparatus for selectively controlling just in time compilation of a method.

2. Description of Related Art

Java is an object-oriented programming language and environment, focusing on defining data as objects and the methods that may be applied to those objects. Java is designed to solve a number of problems in modern programming practice. Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to a particular computer architecture. A bytecode is a machine independent code generated by the Java compiler and executed by a Java interpreter. A Java interpreter is a module that alternately decodes and executes a bytecode. The decoding of the bytecode places the instruction into an executable form for the computer on which the code is to be executed. Then, the instruction is executed by the computer. These bytecode instructions are designed to be easy to interpret on any machine and easily translated on the fly into native machine code.

The Java Virtual Machine (JVM) is a virtual computer component that resides only in memory. A JVM includes components necessary to run a program on a computer, including an interpreter. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to a particular computer architecture. A bytecode is a machine independent code generated by the Java compiler and executed by a Java interpreter.

When extra speed in executing a Java program or applet is needed, a just in time (JIT) compiler may be used to translate bytecodes for a method or class into native machine instructions before executing them. Typically, this compilation only occurs once per method. Some JIT compilers may compile entire classes rather than one method at a time.

In some situations, a JIT compiler may produce invalid results when compiling bytecodes from a given method of a class into instructions or machine code for execution on the computer. These errors do not occur if the code is not just in time compiled. Typically, these errors in execution of native instructions occur as a result of faulty logic in the JIT compiler. Currently, a mechanism for avoiding these errors is unavailable.

Therefore, it would be advantageous to have an improved method and apparatus for just in time compiling of methods.

SUMMARY OF THE INVENTION

The present invention provides a method and apparatus in a data processing system for optimizing running of bytecode. An application programming interface is called for just in time compilation of bytecode. The bytecode just in time compiling is enabled or disabled using the application programming interface. Language keyword extensions can be placed in the source code which are source compiled into the output bytecodes, or may be placed in an external file, which provide for runtime optimization instructions to a virtual machine, a just in time bytecode compiler or the ClassLoader. Just in time compiling of the bytecodes is optimized during execution of the bytecodes using dynamic application programming interfaces. Dynamic runtime API's enable or disable the just in time compiling of objects based on compilation errors, execution performance and frequency of executions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2A–2C illustrate static scoping of just in time compiling through the extension of the Java language with keywords;

FIGS. 5A–5B illustrate extensions to the class Java.Object for runtime API's to enable or disable the just in time compiling of Java objects at the bytecode level;

DETAILED DESCRIPTION OF THE PREFERRED EMBODIMENT

Figure 1:
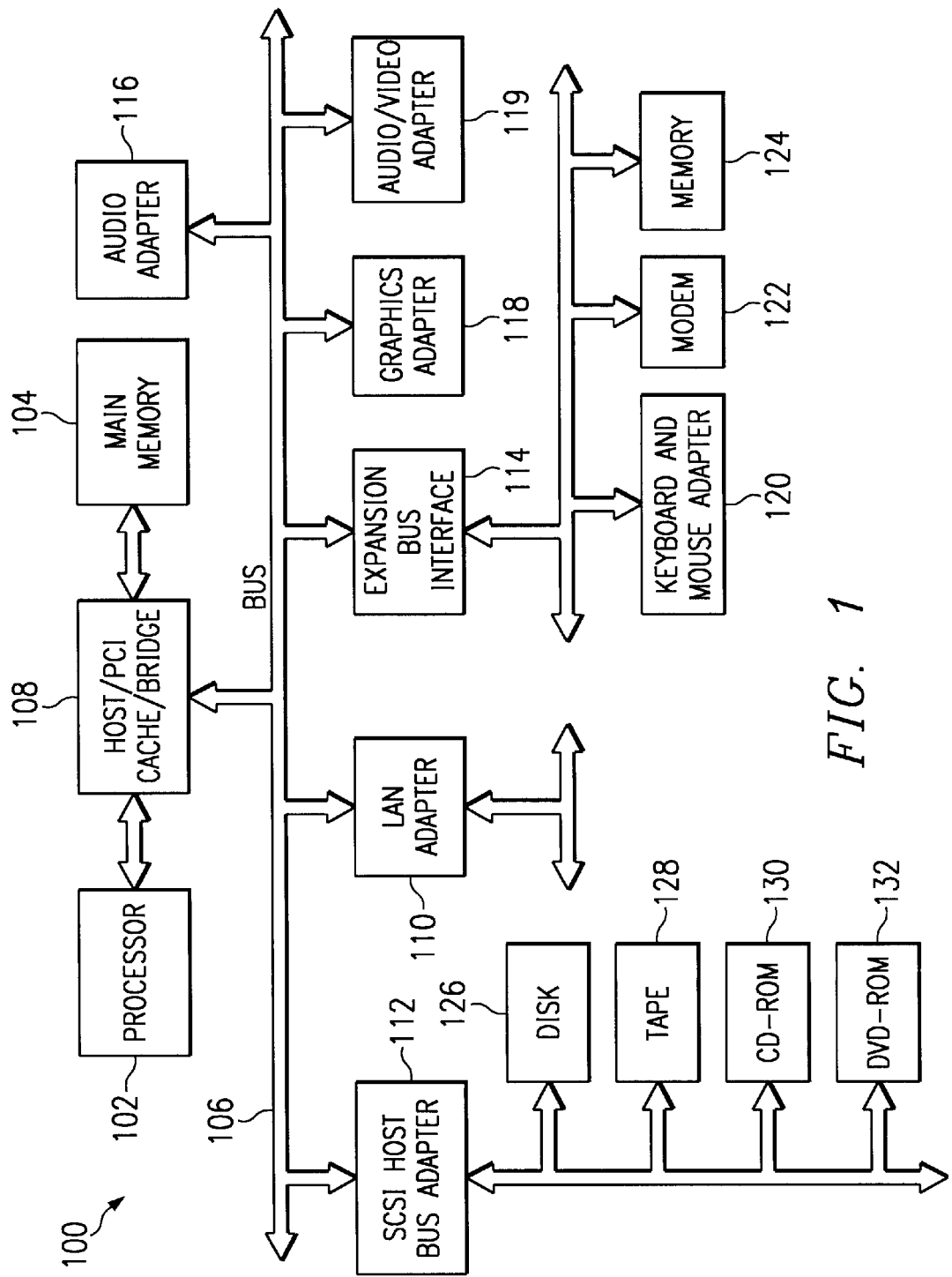
FIG. 1 is a block diagram of a data processing system in which the present invention may be implemented.

With reference now to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, CD-ROM drive 130, and digital video disc read only memory drive (DVD-ROM) 132 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object-oriented programming system such as Java may run in conjunction with the operating system and provides calls to the operating system from Java programs or applications executing on data processing system 100. Instructions for the operating system, the object-oriented operating system, and applications or programs are located on storage devices, such as hard disk drive 126 and may be loaded into main memory 104 for execution by processor 102.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to a multiprocessor data processing system.

The present invention provides a method, an apparatus, and instructions for statically or dynamically selecting which Java objects, classes, methods or code sections are to be just in time compiled. This is also referred to as being "JITed" at the level of the source code. The present invention allows for selection of Java objects to be selectively just in time compiled. This mechanism provides for static scoping of just in time compiling through the extension of the Java language. Scoping is a technique for upgrading or downgrading a range of code. In this example the range of code will be increased. For instance, a code section could be scoped to its method and the method scoped to its class. A programmer may statically scope the JIT'ing of various classes, methods, or bytecodes through the extension of the Java language.

Additionally, through the use of dynamic calls executed by the code itself, code could be customized at runtime. Interactive runtime API's would enable or disable JIT'ing of Java objects.

Therefore, rather than making the interface or compiler responsible for determining which object to just in time compile, the source code itself could specify whether or not to just in time compile the object.

In other languages such as C++ methods have been formulated that allow developers to assist the compiler and runtime environment in optimizing compiling of their code. While the concept of assisting the compiler in the form of adding keywords like "inline" and "volatile" to the code is understood from C++, Java has no way to do this. More importantly, the concept of assisting just in time compilers with keyword extensions to Java language has been overlooked completely in favor of changing the Java code itself and recompiling to code around the JIT compile problems, servicing the JIT compiler itself or disabling the JIT compiler for the virtual machine (VM), thereby reducing performance by causing all classes to be passed to the interpreter.

FIGS. 2A–2C illustrate static scoping of just in time compiling through the extension of the Java language with keywords. In a preferred embodiment of the present invention, the programmer uses the existing concept of assisting the compiler with pre-compile keywords extensions of the Java language in order to optimize or designate compiling of code. The keywords are intended to be used as JIT'ing options by a ClassLoader, interpreter or just in time (JIT) compiler.

Keyword extensions to the Java language such as "OPTIMIZE_INLINE", "OPTIMIZE_JIT" or "OPTIMIZE_NO_JIT" could be included at the code level to classes, methods or scope sections to be just in time compiled. In the present invention the keywords are added to the code itself, rather than the interface referring the lists or tables in a data structure for just in time compiling instructing. The programmer identifies the code sections to be compiled or optimized before compiling by inserting a static declaration consisting of a JIT'ing option keyword extension in conjunction with the identity of the code section.

For instance, in FIG. 2A the programmer might specify that a certain class, method, or scope section to always be just in time compiled. A keyword extension of the Java language might look like:

OPTIMIZE_JIT

In a similar mode, FIG. 2B, the programmer might specify that a certain class, method, or scope section to never be just in time compiled. A keyword extension of the Java language might look like:

OPTIMIZE_NO_JIT

In a further refinement of the invention illustrated in FIG. 2C, the programmer might optimize the just in time compiling of a class or method in a certain way. By using the "OPTIMIZE_INLINE" keyword the programmer asserts that he knows which optimizing basis works best for the code section. Optimization might be based on the number of times the class or method is complied, the time that compilation takes, or even the memory needed for the compiled bytecode when using a particular just in time compiler. A keyword extension of the Java language might look like:

OPTIMIZE_INLINE

Using the above described keyword extension to specify JIT'ing options for a certain class, method, and scope section, respectively, might include the following examples:
public optimize_JIT class Hello World {}
private optimize_JIT void foo() {}
private void foo() {
    int A=100
        optimize_JIT {
            for (int B=0; B<A; B++) doit();
        }

Figure 3:
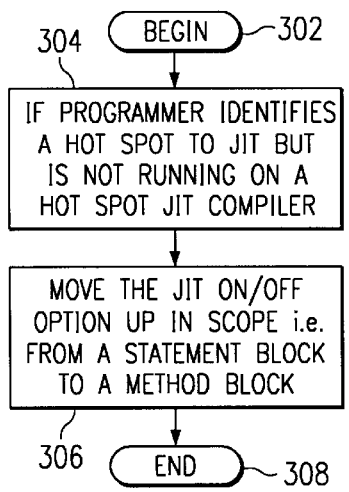
FIG. 3, illustrates a flowchart depicting a programmer static scoping of just in time compiling the bytecode in accordance with a preferred embodiment of the present invention.

Turning now to FIG. 3, a diagram illustrating a flowchart depicting a programmer static scoping of just in time compiling the bytecode in accordance with a preferred embodiment of the present invention. The process begins (step 300). Java source code is examined by the programmer to determine if just in time compiling is needed. In the example, the programmer identifies a section of source code, high traffic statement block or "hot spot", which is intended to be just in time compiled. Hot spot just in time (JIT) compilers are just in time compilers used to compile a particular hot spot which is identified. In that way only the sections of source code needing to be just in time compiled are actually just in time compiled. The remainder of the class or method is executed by the interpreter.

The programmer identifies a hot spot to just in time compile, but the section of source code identified is not running on a hot spot compiler (step 304). If a hot spot just in time compiler is not available, the identified hot spot can be upgraded in scope to the method containing said hot spot. This could be performed by a ClassLoader interpreter or just in time compiler.

In this example the just in time compiling option is moved from the statement block to the method block thereby just in time compiling the entire method rather than continually interpreting a method which contains a hot spot that was specified for just in time compiling. The source code is then optimized taking account of the hot spot not running on a hot spot compiler and ready to run. The process ends (step 308).

While the example is directed to static scoping a hot spot method, the process could be automated by using a performance monitoring application to automatically detecting hot spots. This can be accomplished by identifying sections of code which are repeatedly executed by comparing the number of executions against a threshold number. Once the threshold is crossed, a hot spot is identified and the hot spot checked for assignment to a hot spot just in time compiler. If a hot spot just in time compiler has not been assigned to the hot spot, the hot spot can be automatically scoped to its method and the entire method optimized for just in time compiling.

Static scoping by designating classes, methods, or code sections to be just in time compiled gives the programmer a utility to optimize compilation of bytecode without having the interface look up the class or method in the data structure for compiling instructions. However, optimizing is based either on the knowledge of the programmer or results gathered from running the bytecodes and evaluating performance results. Continually guessing, testing the results, and static scoping the source code is tedious and error prone. Another feature of the present invention is to implement interactive runtime API's to enable or disable just in time compiling of classes, methods, or bytecode sections, which are executed by the code itself.

Figure 4:
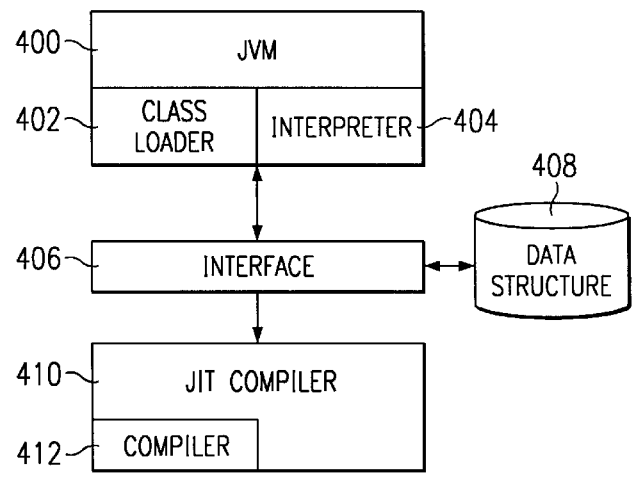
FIG. 4 is a diagram of components used to selectively process methods and classes in accordance with a preferred embodiment of the present invention.

With reference now to FIG. 4, a diagram of components used to selectively process methods and classes is depicted in accordance with a preferred embodiment of the present invention. In this example, JVM 400 includes a ClassLoader 402 and an interpreter 404. Interface 406 includes a mechanism for selecting which methods are not to be just in time compiled based on information located in data structure 408. The information in data structure 408 may contain information to indicate which methods are not to be just in time compiled. Also shown in FIG. 4 is a JIT compiler 410, which includes a compiler unit 412. JVM 400 and JIT compiler 410 include other components, which are not shown to avoid obscuring the description of the present invention.

JVM 400 will start execution by invoking a method of a specified class. In the depicted example, this method may be, for example, main. The method may be passed a single argument in the form of an array of strings. This causes the specified class to be loaded, linked to other types that it uses, and initialized. The loading of a class involves finding the binary form of a class or interface type with a particular name. In the depicted example, the loading process is implemented by ClassLoader 402. ClassLoader 402, in this example, includes a ClassLoader class, which includes methods for loading new classes into the Java runtime environment. In the depicted example, interpreter 404 is a program that translates a bytecode into an instruction and then executes the instruction. The bytecode is translated into a form executable by the computer in which the JVM is located.

FIGS. 5A–5B illustrate extensions to the class Java.Object for runtime API's to enable or disable the just in time compiling of Java objects at the bytecode level.

FIG. 5A illustrates a runtime application programming interface (API) extension of the class Java.Object for enabling or disabling just in time compiling.

public static void setJITEnabled(boolean Allowed)

dynamically sets or enables just in time compilation of a class, method, or code section based on the outcome of some function or method. For instance, if a timing method related to compiling a class returns a 'True', where true is passed to the above method as the variable allowed, then the setJITEnabled method enables the just in time compiling for that class. Conversely, if the timing method related to compiling a class returns a 'False', then the setJITEnabled method disables the just in time compiling for that class.

Extending the class Java.Object with other API's is also possible, such as:

```
public static void setJITDisabled(boolean Allowed)
```

If a timing method related to compiling a class returns a 'True', then the setJITDisable method disables the just in time compiling for that class rather than a 'False' returned from the timing method. While this extension of class java.Object is informative, merely defining the method—public static void setJITEnabled(boolean Allowed)—such that any return but a 'True' disables the just in time compiling, avoids having to define another extension of the class.

FIG. 5B illustrates a second type of application programming interface (API) call designed allow output the status of the just in time compiling, whether enabled or not.

```
public static boolean isJITEnabled()
```

This call is useful for the programmer to help confirm whether just in time compiling is enabled or whether the status has changed.

While there are many possible uses for the interactive API's, some example embodiments are described below. These embodiments are only exemplary in nature and in no way are meant to limit either the scope of the invention or of the possible applications for the invention.

In one embodiment, the interactive API's enable and disable just in time compiling in a performance analysis method in order to help a programmer check the performance of a method or the interaction of a method and the Java Virtual Machine.

Figure 6:
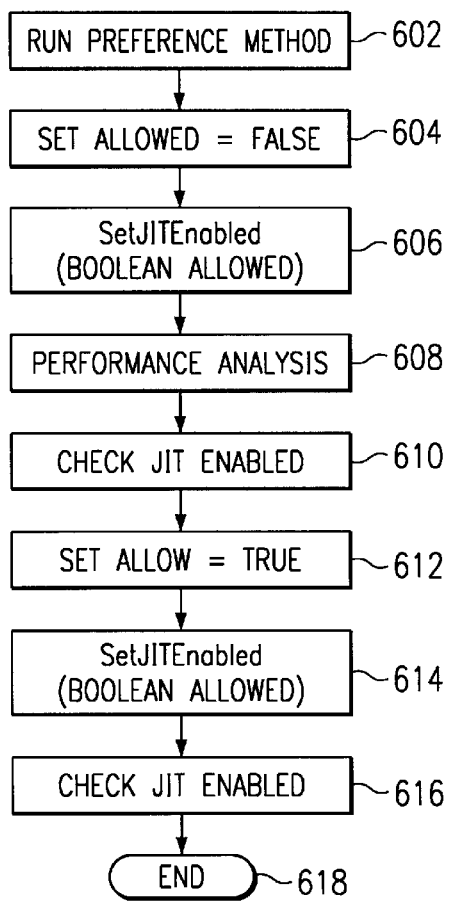
FIG. 6 illustrates performance analysis method that runs the bytecode once as not JIT'ed, and then enables the JIT'ing of the bytecode and runs it again.

FIG. 6 illustrates a performance analysis method that runs the bytecode once as not JIT'ed, and then enables the JIT'ing of the bytecode and runs it again. The process starts by running the performance method or code (step 602). A typical performance analysis method is a performance shell containing a test method with test values. However, the performance method could just as well measure the performance of a method other than a test method. The performance method invokes the method and monitors its execution. Before running the method, the performance method first sets the Allowed equal to 'False' (step 604). In the preferred embodiment, because of class setJITEnabled (boolean Allowed) extension to the class java.Object, a 'False' disables just in time compiling of the method at the code level. So, setJITEnabled(boolean Allowed) disables the just in time compiler (step 606). Therefore, when the method is invoked by the performance analysis method, the method is passed to the interpreter rather than the just in time compiler.

At various times during the execution, the performance method might output performance data or store the data for later analysis (step 608). The status of the just in time compiling can then be checked to verify that the just in time compiling was disabled for the method (step 610). The extension to class java.Object, is JITEnabled() allows for verifying whether the class or method was compiled or not at the code level.

Once the method has run, the performance method sets the 'Allowed' equal to 'True' (step 612). In the preferred embodiment, because of class setJITEnabled(boolean Allowed) extension to the class java.Object, a 'True' enables just in time compiling. So, setJITEnabled(boolean Allowed) enables the just in time compiling of the method at the code level (step 614). Therefore, when the method is invoked by the performance analysis method, the method is passed to the just in time compiler. Another performance check could be made, but is not illustrated in the flowchart. The status of the just in time compiling can then be checked to verify that the just in time compiling was enabled for the method (step 616). The extension to class java.Object, is JITEnabled() allows for verifying whether the method was to be compiled or not.

The process could be rerun a number of times depending on the performance parameters being monitored. In other embodiments, performance results for interpretating the code and just in time compiling the code could be compared and then interactively, enabling or disabling just in time compiling based on the performance results comparison. In this manner, no programmer intervention is necessary for selecting optimal compiling. The performance method ends once the monitoring has been completed (step 618).

Figure 7:
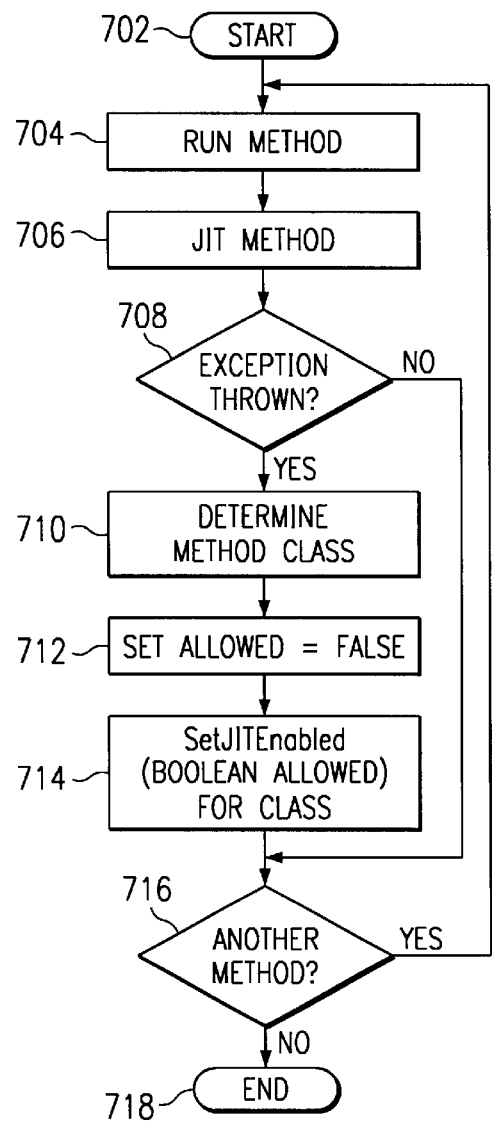
FIG. 7 illustrates a flowchart of a process for interactively disabling just in time compiling at runtime, based on an exception.

Another embodiment of the present invention involving interactive API's is to interactively disable just in time compiling based on an exception being thrown when compiling the method. FIG. 7 illustrates a flowchart of a process for interactively disabling just in time compiling at runtime, based on an exception.

The process starts (step 702) and a method is invoked (step 704). The method is initially just in time compiled (step 706). Next, code determines if an exception is thrown (step 708). If no exception has been thrown in compiling the method, the process skips forward to decide if another method is available to be invoked. If an exception is captured, the method's class is determined (step 710). By knowing the class, just in time compiling all instanced of the class can be disabled by setting 'Allowed' equal to 'False' (step 712) for the offending class. Because of class setJITEnabled(boolean Allowed) extension to the class java.Object, a 'False' disables just in time compiling of every instance of the class at the code level. So, setJITEnabled(boolean Allowed) disables the just in time compiling the entire class (step 714).

Once just in time compiling for the entire class has been disabled at the code level, any instance of the class is passed to the interpreter rather than the compiler for compiling. Other class methods can then be invoked. The interactive application programming interface (API) would allow the code to capture an exception in that class at runtime, and then disable the just in time compiling of all instances of that offending class in an attempt to circumvent the exception caused through just in time compiling of that class as discussed above. When no methods are available, the process ends (step 718).

Figure 8:
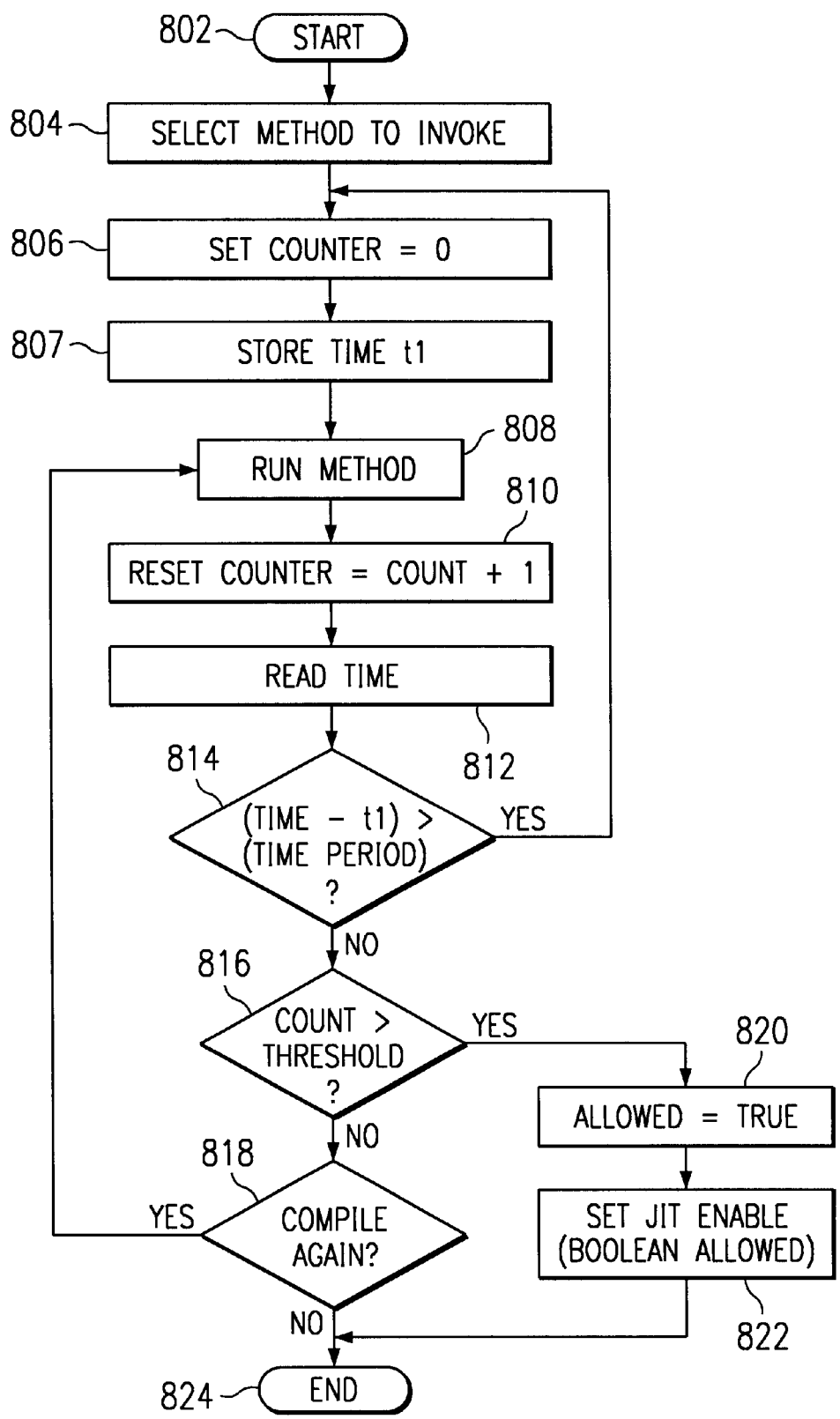
FIG. 8 illustrates a flowchart for interactively enabling just in time compiling upon the determination that a threshold number of compilations have been reached.

In another embodiment of the present invention, the code at runtime may keep track of how often it is run over a time interval and decide to enable just in time compiling itself, if a certain threshold is reached. FIG. 8 illustrates a flowchart for interactively enabling just in time compiling upon the determination that a threshold number of compilations have been reached.

The process starts (step 802), and a method is selected to be invoked (step 804). A timer and a counter are provided for in the code and set the counter initially to 0 (step 806). The time can either be set to 0 or the time $t_1$ merely stored for future reference (step 807). The method is run by either passing the method to the interpreter or to a just in time compiler (step 808).

The code interactively monitors the number of times the method is run with respect to a prescribed time limit by first resetting the counter to the counter value+1, thereby adding a count for every time the method has been run (step 810). The time of the last running is read (step 812), subtracted from $t_1$ stored at step 807, and compared to the prescribed time period (step 814). If any counted executions occurred longer ago than the prescribed time period, the process returns to step 806 and the measured time period starts again.

Maintaining counts only in the window of the prescribed time period is accomplished by examining the time of the last execution, less the value of $t_1$ to the prescribed time period. If it is greater, or outside the window of the prescribed time period, no action is taken by the code to enable just in time compiling. If, on the other hand, all counts occurred within the window of the prescribed time period, the process checks the number of counts with a threshold value (step 816). The threshold is the number of executions needed to justify just in time compiling the method rather than passing the method to the interpreter. If the count is below the threshold value, a determination is made whether to execute the method again (step 818). If the method is to be compiled again, the method is passed back to step 808 with the present counts. The process continues from step 808. If executions of the method have been completed, the process ends (step 824).

However, if the number of counts is greater than the threshold value (step 816), compilation could be optimized by enabling just in time compiling. In that case, the code sets the 'Allowed' equal to 'True' (step 820). In the preferred embodiment, because of class setJITEnabled(boolean Allowed) extension to the class java.Object, a 'True' enables just in time compiling. So, setJITEnabled(boolean Allowed) enables the just in time compiling of the method at the code level (step 822). The method is then interactively enabled, executed by the code itself, to be just in time compiled without intervention by the programmer. The process then ends (step 824).

In accordance with a preferred embodiment of the present invention. JVM 400 may be enabled to recognize either static scoping of JIT'ing through the extension of the Java language or dynamic (interactive) runtime API's to enable or disable JIT'ing of Java objects. The API's are generated by either the programmer or interactively by the JVM 400. Once a Java object, class, method or code section has been enabled or disabled at the code level, JVM 400 must be enabled to recognize these new API class extensions. The JVM 400 then passes the Java object to either the interpreter 404, via the ClassLoader 402, or interface 406 depending on whether the Java object has been JIT enabled or disabled.

In other means for enabling JIT compilers, the information as to which classes or methods should not be just in time compiled are stored in a data structure. Interface 406 may receive the call for the method destined for JIT compiler 410. Interface 406 receives or intercepts the method being passed to JIT compiler 410 in this example by registering itself as a JIT compiler that is to receive the method in place of JIT compiler 410. The method is then received from JVM 400 by interface 406 through a compile class application programming interface (API) invoked by interpreter 404 in JVM 400. Interface 406 takes the method information received from ClassLoader 402 and determines whether or not to JIT a particular method. In this example, the determination is made by comparing the method name to a list or table method in data structure 408. If the method is to be just in time compiled, the method is then passed on to JIT compiler 410. Otherwise, interface 406 may place a call back to JVM 400 to have interpreter 404 interpret the method.

While the present invention of statically or dynamically enabling JIT'ing in the code itself saves having to maintain a list or a table in data structure 408, by enabling JIT'ing, executed by the code itself, in certain cases it might be advantageous to also maintain the information in data structure 408. In another embodiment, the programmer makes a prediction to the best compiling option, and then enable and/or disable JIT'ing for a Java object. If the object runs as predicted, no changes are needed. However, if not, changes could be made interactively by the code itself through an application programming interface (API) invoked by JVM 400.

It is important to note that while the present invention has been described in the context of a fully functioning data processing system, those of ordinary skill in the art will appreciate that the processes of the present invention are capable of being distributed in a form of a computer-readable medium of instructions and a variety of forms, and that the present invention applies equally regardless of the particular type of signal-bearing media actually used to carry out the distribution. Examples of computer-readable media include recordable-type media such as a floppy disc, a hard disk drive, a RAM, and a CD-ROM; and transmission type media such as digital and analog communications links.

The description of the present invention has been presented for purposes of illustration and description, but is not limited to the exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are non-specific to a computer on which the instructions are to be executed. In such a case, a virtual machine on the computer may interpret the instructions or send the instructions to a compiler to generate code suitable for execution by the computer on which the virtual machine is located. The embodiment was chosen and described in order to best explain the principles of the invention, the practical application, and to enable others of ordinary skill in the art to understand the invention for various embodiments with various modifications are as suited to the particular use contemplated.

What is claimed is:

1. A process implemented in a data processing system for optimizing compiling of a bytecode, the process comprising the data processing system implemented step of:

extending a language to cover controlling compiling of the bytecode, wherein an extended language is formed;

running the bytecode; and controlling compiling of the bytecode using the extended language.

2. The process of claim 1, wherein extending the language includes creating an interactive runtime application programming interface.

3. The process of claim 2, wherein the step of controlling compiling of the bytecode includes enabling just in time coupling of the bytecode.

4. A process implemented in a data processing system for optimizing compiling of a bytecode, the process comprising the data processing system implemented steps of:

extending a language to convert controlling compiling of the bytecode, wherein an extended language is formed;

statically scoping the bytecode using the extended language to form a scoped bytecode;

running the scoped bytecode; and controlling compiling of the scope bytecode using the extended language.

5. The process of claim 4, wherein the step of statically scoping the bytecode includes specifying a type of optimization for compiling the bytecode.

6. The process of claim 4, wherein the step of statically scoping the bytecode includes specifying just in time compiling the bytecode.

7. The process of claim 4, wherein the step of statically scoping the bytecode includes satisfying not just in time compiling the bytecode.

8. The process of claim 7, wherein the bytecode is at least one of a class, method and code section.

9. A process implemented in a data processing system for optimizing compiling of a bytecode, the process comprising the data processing system implemented step of:

extending a language to cover controlling compiling of the bytecode, wherein an extended language is formed and, wherein extending a language comprise adding at least one keyword related to optimizing compiling of the bytecode;

running the bytecode; and controlling compiling of the bytecode using the extended language.

10. A process in a data processing system for optimizing compiling of a bytecode, the process comprising the data processing system implemented step of:

extending a language to cover controlling compiling of the bytecode, wherein an extended language is formed;

running the bytecode; and controlling compiling of the bytecode using the extended language in runtime.

11. The process of claim 10, wherein the step of controlling compiling of the bytecode includes enabling just in time compiling based on frequency of running the bytecode.

12. The process of claim 10, wherein the step of controlling compiling of the bytecode further comprises:

interactively monitoring performance of compiling the bytecode; and optimizing the compiling of the bytecode based on the compilation performance.

13. The process of claim 12, wherein the performance is measured by speed of compiling the bytecode.

14. The process of claim 12, wherein the performance is measured by memory space needed to store a compiled bytecode.

15. A process in a data processing system for optimizing compiling of a bytecode, the process comprising the data processing system implemented step of:

extending a language to cover controlling compiling of the bytecode, wherein an extended language is formed;

running the bytecode; and controlling compiling of the bytecode using the extended language in runtime, wherein the step of controlling compiling of the bytecode includes preventing just in time compiling based on an error in compiling.

16. A process system for optimizing compiling of a bytecode, comprising:

language extension, wherein the language extension controls compiling of the bytecode;

running means for running the bytecode; and controlling means for controlling compiling of the bytecode using the extended language.

17. The processing system of claim 16, wherein the language extension includes an interactive runtime application programming interface.

18. The processing system of claim 17, wherein the controlling means includes enabling just in time compiling of the bytecode.

19. A processing system for optimizing compiling of a bytecode, comprising:

a language extension to cover controlling compiling of the bytecode, wherein an extended language is formed;

running means for running the bytecode;

controlling means for controlling compiling of the bytecode using the extended language; and static scoping means for statically scoping the bytecode.

20. The processing system of claim 19, wherein the static scoping means includes a specifying means for specifying a type of organization for compiling the bytecode.

21. The processing system of claim 19, wherein the static scoping means includes specifying means for specifying just in time compiling the bytecode.

22. The processing system of claim 19, wherein the static scoping means includes specifying means for specifying not just in time compiling the bytecode.

23. The processing system of claim 22, wherein the bytecode is at least one of a class, method and code section.

24. A processing system for optimizing compiling of a bytecode, comprising:

language extension to cover controlling compiling of the bytecode, wherein an extended language is formed, wherein the language extension comprises adding at least one keyword related to optimizing compiling of bytecode;

running means for running the bytecode; and controlling means for controlling compiling of the bytecode using the extended language.

25. A processing system for optimizing compiling of a bytecode, comprising:

language extension to cover controlling compiling of the bytecode, wherein an extended language is formed;

running means for running the bytecode; and controlling compiling of the bytecode using the extended language in runtime, wherein the controlling means for controlling compiling of the bytecode includes preventing just in time compiling based on an error in compiling.

26. A processing system for optimizing compiling of a bytecode, comprising:

a language extension, wherein the language extension controls compiling of the bytecode;

running means for running the bytecode; and controlling compiling of the bytecode using the extended language in runtime.

27. The processing system product of claim 25, wherein the controlling means for controlling compiling of the bytecode includes enabling just in time compiling based on frequency of running the bytecode.

28. The processing system product of claim 25, wherein the controlling means for controlling compiling of the bytecode further comprises:

interactive monitoring means for interactively monitoring performance of compiling the bytecode; and optimizing means for optimizing the compiling of the bytecode based on the compilation performance.

29. The processing system of claim 28, wherein the performance is measured by speed of compiling the bytecode.

30. The processing system of claim 28, wherein the performance is measured by memory space needed to store a compiled bytecode.

31. A computer program product including instructions implemented on a data processing system for optimizing compiling of a bytecode, the instructions embodied on a computer readable medium and comprising:

a language extension to cover controlling compiling of the bytecode;

instructions for running the bytecode; and instructions for controlling compiling of the bytecode using the language extension.

32. The method of claim 31, wherein the language extension includes an interactive runtime application programming interface.

33. The computer program product of claim 32, wherein instructions for controlling compiling of the bytecode includes enabling just in time compiling the bytecode.

34. A computer program product including instructions implemented on a data processing system for optimizing compiling of a bytecode, the instructions embodied on a computer readable medium and comprising:

a language extension to cover controlling compiling of the bytecode;

instructions for running the bytecode;

instructions for controlling compiling of the bytecode using the language extension, and instructions for statically scoping the bytecode.

35. The computer program product of claim 34, wherein instructions for statically scoping the bytecode includes instructions for specifying a type of optimization for compiling the bytecode.

36. The computer program product of claim 34, wherein instructions for statically scoping the bytecode includes instructions for specifying just in time compiling the bytecode.

37. The computer program product of claim 34, wherein instructions for statically scoping the bytecode includes instructions for specifying not just in time compiling of the bytecode.

38. The computer program product of claim 37, wherein the bytecode is at least one of a class, method and code section.

39. A computer program product including instructions implemented on a data processing system for optimizing compiling of a bytecode, the instructions embodied on a computer readable medium and comprising:

language extension to cover controlling compiling of the bytecode, wherein the language extension comprises adding at least one keyword related to optimizing compiling of the bytecode;

instructions for running the bytecode; and instructions for controlling compiling of the bytecode using the language extension.

40. A computer program product including instructions implemented on a data processing system for optimizing compiling of a bytecode, the instructions embodied on a computer readable medium and comprising:

language extension to cover controlling compiling of the bytecode;

instructions for running the bytecode; and instructions for controlling compiling of the bytecode using the language extension in runtime, wherein the instructions for controlling compiling of the bytecode includes preventing just in time comprising based on an error in compiling.

41. A computer program product including instructions implemented on a data processing system for optimizing compiling of bytecode, the instructions embodied on a computer readable medium and comprising:

language extension to cover controlling compiling of the bytecode;

instructions for running the bytecode; and instructions for controlling compiling of the bytecode using the language extension in runtime.

42. The computer program product of claim 41, wherein the instructions for controlling compiling of the bytecode includes enabling just in time compiling based on frequency of running the bytecode.

43. The computer program product of claim 41, wherein the controlling compiling of the bytecode further comprises:

instructions for interactively monitoring performance of compiling the bytecode; and instructions for optimizing the compiling of the bytecode based on the compilation performance.

44. The computer program product of claim 43, wherein the performance is measured by speed of compiling the bytecode.

45. The computer program product of claim 43, wherein the performance is measured by memory space needed to store a compiled bytecode.

46. A process in a data processing system to optimizing running a plurality of bytecodes, the method comprising:

inserting a language extension within the plurality of bytecodes; and executing the plurality of bytecode, wherein the language extension causes a selected portion of the plurality of bytecodes to be compiled while unselected portions of the plurality of bytecodes are interpreted.

47. The process of claim 46, wherein the selected portion of the plurality of bytecodes is a method of a number of bytecodes.

48. The process of claim 46, wherein the language extension is inserted into a source code, which is compiled into the plurality of bytecodes.

49. The process in a data processing system for optimizing running of a plurality of bytecodes, the method comprising:

receiving a plurality of bytecodes; and responsive to detecting a language extension, selectively compiling a portion of the plurality bytecodes while interpreting the other portion of the plurality of bytecodes.

50. The process of claim 49, wherein the portion of the plurality of bytecodes is a method.

51. The process of claim 49, wherein the process is located in a Java virtual machine.

52. A data processing system comprising:

inserting means for inserting a language extension within a plurality of bytecodes; and executing means for executing the plurality of bytecode, wherein the language extension causes a select portion of the plurality of bytecodes to be compiled while unselected portions of the plurality of bytecodes are interpreted.

53. The process of claim 52, wherein the selected portion of the plurality of bytecodes is a method of a number of bytecodes.

54. The process of claim 52, wherein the language extension is inserted into a source code, which is compiled into the plurality of bytecodes.

55. A data processing system comprising:
   receiving means for receiving a plurality of bytecodes; and
   executing means, responsive to detecting a language extension, for selectively compiling a portion of the plurality bytecodes while interpreting the other portion of the plurality of bytecodes.

56. The process of claim 55, wherein the portion of the plurality of bytecodes is method.

57. The process of claim 55, wherein the receiving means and the executing means are located in a Java virtual machine.

58. A data processing system comprising:
   a bus;
   a memory connected to the bus, wherein the memory includes as set of instructions;
   a processor connected to the bus, wherein the processor executes the set of instructions to insert a language extension within a plurality of bytecodes; and execute the plurality of bytecode, wherein the language extensions causes a selected portion of the plurality of bytecodes to be compiled while unselected portions of the plurality of bytecodes are interpreted.

59. A data processing system comprising:
   a bus;
   a memory connected to the bus, wherein the memory includes a set of instructions;
   a processor connected to the bus, wherein the processor executes the set of instructions to receive a plurality of bytecodes, selectively compile a portion of the plurality bytecodes, and interpret the other portion of the plurality of bytecodes in response to detecting a language extension.

60. A computer program product in a computer readable medium for optimizing running a plurality of bytecodes in a data processing system, the computer program product comprising:
   first instructions for inserting a language extension within a plurality of bytecodes; and
   second instructions for executing the plurality of bytecode, wherein the language extension causes a selected portion of the plurality of bytecodes to be compiled while unselected portions of the plurality of bytecodes are interpreted.

61. The computer program product of claim 60, wherein the selected portion of the plurality of bytecodes is a method of a number of bytecodes.

62. The computer program product of claim 60, wherein the language extension is inserted into a source code, which is compiled into the plurality of bytecodes.

63. A computer program product in a computer readable medium for optimizing running of a plurality of bytecodes in a data processing system, the computer program product comprising:
   first instructions for receiving a plurality of bytecodes; and
   second instructions, responsive to detecting a language extension, for selectively compiling a portion of the plurality bytecodes while interpreting the other portion of the plurality of bytecodes.

64. The computer program product of claim 63, wherein the portion of the plurality of bytecodes is a method.

65. The computer program product of claim 63, wherein the first instructions and the second instructions are located in a Java virtual machine.

* * * * *

UNITED STATES PATENT AND TRADEMARK OFFICE
CERTIFICATE OF CORRECTION

PATENT NO.     : 6,530,075 B1                                                   Page 1 of 1
DATED          : March 4, 2003
INVENTOR(S)    : Beadle et al.

It is certified that error appears in the above-identified patent and that said Letters Patent is hereby corrected as shown below:

Column 10,
Line 62, delete "coupling" and insert -- compiling --.

Column 11,
Line 4, after "of the", delete "scope" and insert -- scoped --.
Line 13, after "includes", delete "satisfying" and insert-- specifying --.
Line 22, after "language, delete "comprise" and insert -- comprises --.
Line 60, after "A", delete "process" and insert -- processing --.

Column 12,
Line 18, after "includes", delete "a".
Line 19, after "type of", delete "organization" and insert -- optimization --.
Lines 55 and 59, after "claim", delete "25" and insert -- 26 --.

Column 14,
Line 2, after "time", delete "comprising" and insert -- compiling --.
Line 29, after "system", delete "to" and insert -- for --.

Column 15,
Line 12, after "bytecodes is" insert -- a --.

Column 16,
Line 6, delete "a" insert -- the --.

Signed and Sealed this

Twenty-third Day of March, 2004

JON W. DUDAS
*Acting Director of the United States Patent and Trademark Office*